(12) United States Patent
Huang (10) Patent No.: US 6,471,232 B2
(45) Date of Patent: Oct. 29, 2002

(54) LOCKING DEVICE FOR A DETACHABLE BICYCLE TOP TUBE ASSEMBLY

(76) Inventor: May Huang, No. 81, Lane 530, Section 1, Chung Shan Road, Chang Hua City (TW)

( * ) Notice: Subject to any disclaimer, the term of this patent is extended or adjusted under 35 U.S.C. 154(b) by 0 days.

(21) Appl. No.: 09/888,812

(22) Filed: Jun. 25, 2001

(65) Prior Publication Data

US 2002/0043085 A1 Apr. 18, 2002

(30) Foreign Application Priority Data

Aug. 22, 2000 (TW) ....................................... 89214685 U (51) Int. Cl.[7] .............................. B62K 13/00; B62H 3/12
(52) U.S. Cl. ................. 280/304.5; 280/7.11; 280/288.4
(58) Field of Search ................................ 280/7.11, 204, 280/292, 278, 287, 288.4, 281.1, 304.5; 70/235; 224/412, 419–421, 425–427, 319, 329, 924

(56) References Cited

U.S. PATENT DOCUMENTS

| | | | | |
|---|---|---|---|---|
| 529,861 | A | * 11/1894 | Hersh | ......................... 280/7.11 |
| 3,113,785 | A | * 12/1963 | Bohnenkamp | ............... 280/287 |
| 5,149,112 | A | * 9/1992 | Nauman et al. | .......... 280/288.4 |

* cited by examiner

Primary Examiner—Avraham Lerner
Assistant Examiner—Matthew Luby
(74) Attorney, Agent, or Firm—Alan Kamrath; Rider, Bennett, Egan & Arundel, LLP (57) ABSTRACT

A top tube assembly is detachably mounted between a seat tube and a head tube of a bicycle and comprises a tube, two hook-like attaching members, and two latch members. Each attaching member has an end securely attached to an associated end of the tube and mounted around an associated one of a seat tube and a head tube of a bicycle. Each latch member has an end pivotally connected to the associated end of the tube. Each latch member is pivotable along a horizontal plane between a locking position and an unlocking position.

6 Claims, 9 Drawing Sheets

LOCKING DEVICE FOR A DETACHABLE BICYCLE TOP TUBE ASSEMBLY

BACKGROUND OF THE INVENTION

1. Field of the Invention

The present invention relates to a locking device for a detachable bicycle top tube assembly and, more particularly, to a locking device for reliably locking a detachable bicycle top tube between a head top and a seat tube of a bicycle when the detachable bicycle top tube is mounted to the bicycle to be carried by, e.g., a car.

2. Description of the Related Art

Figure 9:
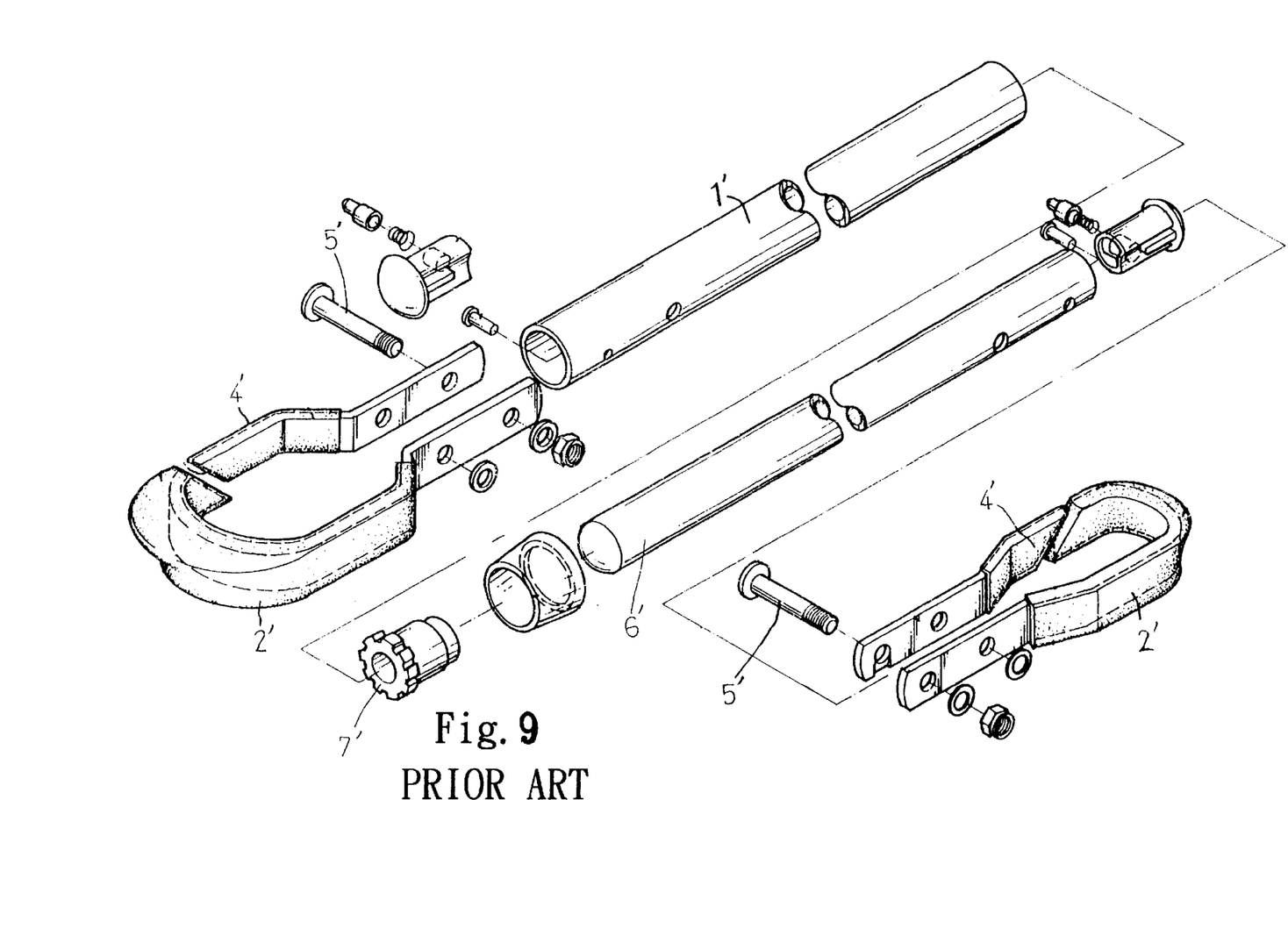
FIG. 9 is an exploded perspective view of a conventional detachable top tube.
Figure 10:
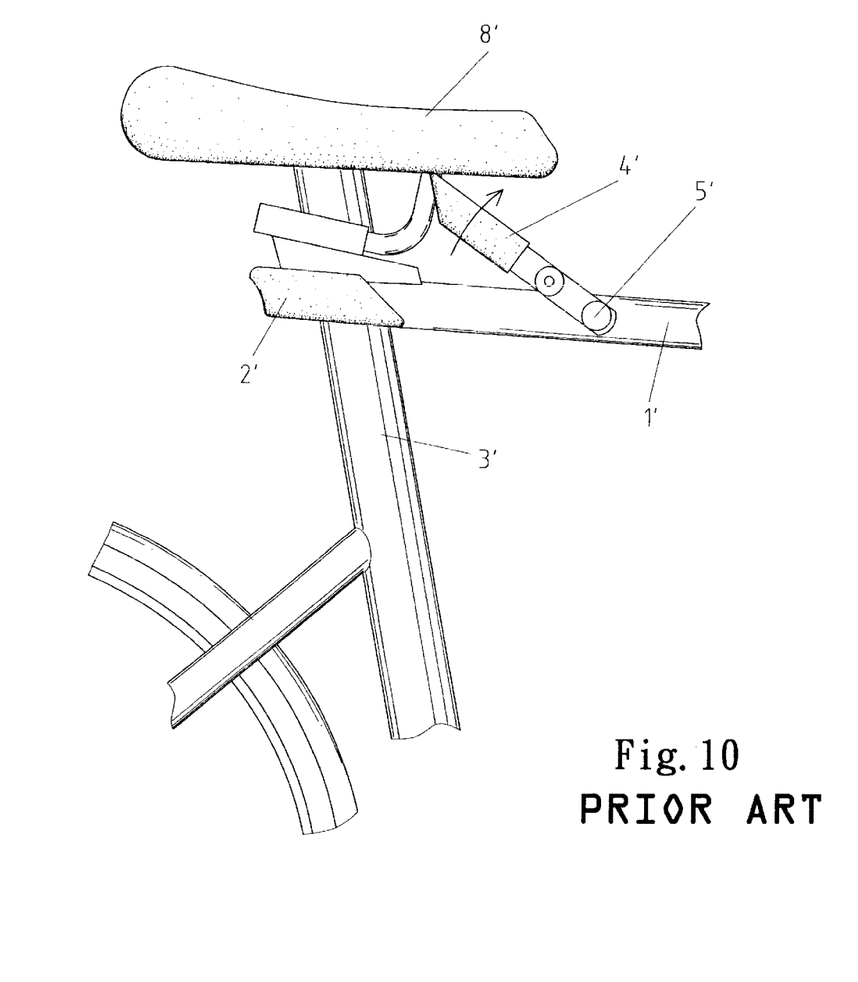
FIG. 10 is a schematic side view illustrating operation of the conventional detachable top tube.

It is popular to cycling in suburb and most of the users carry a bicycle by a car. Typically, a bicycle includes a top tube that can be attached to and thus carried by the car. However, some of the bicycles equipped with cushioning devices have no such top tube. FIG. 9 of the drawings illustrates a conventional detachable top tube that can be removably attached between the head tube (not shown) and the seat tube 3' of a bicycle. The top tube comprises two tube sections 1' and 6' that are connected together by a member 7' to thereby allow adjustment in an overall length of the top tube. Attached to an outer end of each top tube section 1', 6' is a hook-like attaching member 2' that is mounted around the set tube 3' or the head tube. A latch member 4' is pivotally attached to the tube section 1', 6' by a pin 5' (FIG. 10). However, the latch member 4' pivots on a vertical plane, which means that the motion of the latch member 4' will be interfered by the seat 8' of the bicycle, as illustrated in FIG. 10. In addition, attachment of the attaching member 2' to the respective end of the top tube 1' was found unreliable, and the user might be injured by the exposed pin 5'.

SUMMARY OF THE INVENTION

An object of the present invention is to provide a locking device for reliably locking a detachable bicycle top tube between the head top and the seat tube of a bicycle when the detachable bicycle top tube is mounted to the bicycle to be carried a car or the like.

A top tube assembly in accordance with the present invention is detachably mounted between a seat tube and a head tube of a bicycle and comprises:

a tube having two ends;

two hook-like attaching members each having a first end securely attached to an associated said end of the tube, each said attaching member further including a second end, each said attaching member being mounted around an associated one of a seat tube and a head tube of a bicycle; and two latch members each having a first end pivotally connected to the associated end of the tube and a second end, each said latch member being pivotable along a horizontal plane between a locking position in which the second end of the latch member and the second end of an associated said attaching member are so positioned to prevent disengagement of the associated attaching member from the associated one of the seat tube and the head tube of the bicycle and an unlocking position in which the second end of the latch member is moved to a position allowing disengagement of the associated attaching member from the associated one of the seat tube and the head tube of the bicycle.

The tube may comprise two tube sections that are engaged together in a manner allowing an adjustment in an overall length of the tube. The first end of each attaching member is substantially U-shape, and the associated end of the tube comprises a non-circular engaging portion for fittingly and securely receiving the U-shape first end of the associated attaching member. The first end of each attaching member comprises a transverse hexagonal hole and a first pin hole. The associated end of the tube comprises a hexagonal hole aligned with the transverse hexagonal hole and a second pin hole aligned with the first pin hole. The first end of each latch member comprises a third pin hole aligned with the second pin hole and a slot. The slot includes an enlarged portion and an open end.

A locking means is provided for each attaching member and comprises:

a sleeve securely received in the transverse hexagonal hole of the associated said attaching member, a stem received in the sleeve and having an end extending into the slot of the associated latch member, the stem including an enlarged locking portion that is releasably engaged in the enlarged portion of the slot of the associated latch member, an elastic element for biasing the stem to a locking position in which the enlarged locking portion is received in the enlarged portion of the slot of the associated latch member, a push button securely mounted to the end of the stem to move therewith;

wherein when the push button is pushed, the enlarged portion of the stem is disengaged from the enlarged portion of the slot of the associated latch member, thereby allowing pivotal movement of the associated latch member relative to the associated attaching member.

The second end of each attaching member comprises a stepped end face. The second end of the associated latch member comprises a stepped end face that is complimentary to the stepped end face of the associated attaching member. The stepped end face of the second end of the associated latch member is engaged with the stepped end face of the associated attaching member when the latch member is in the locking position.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
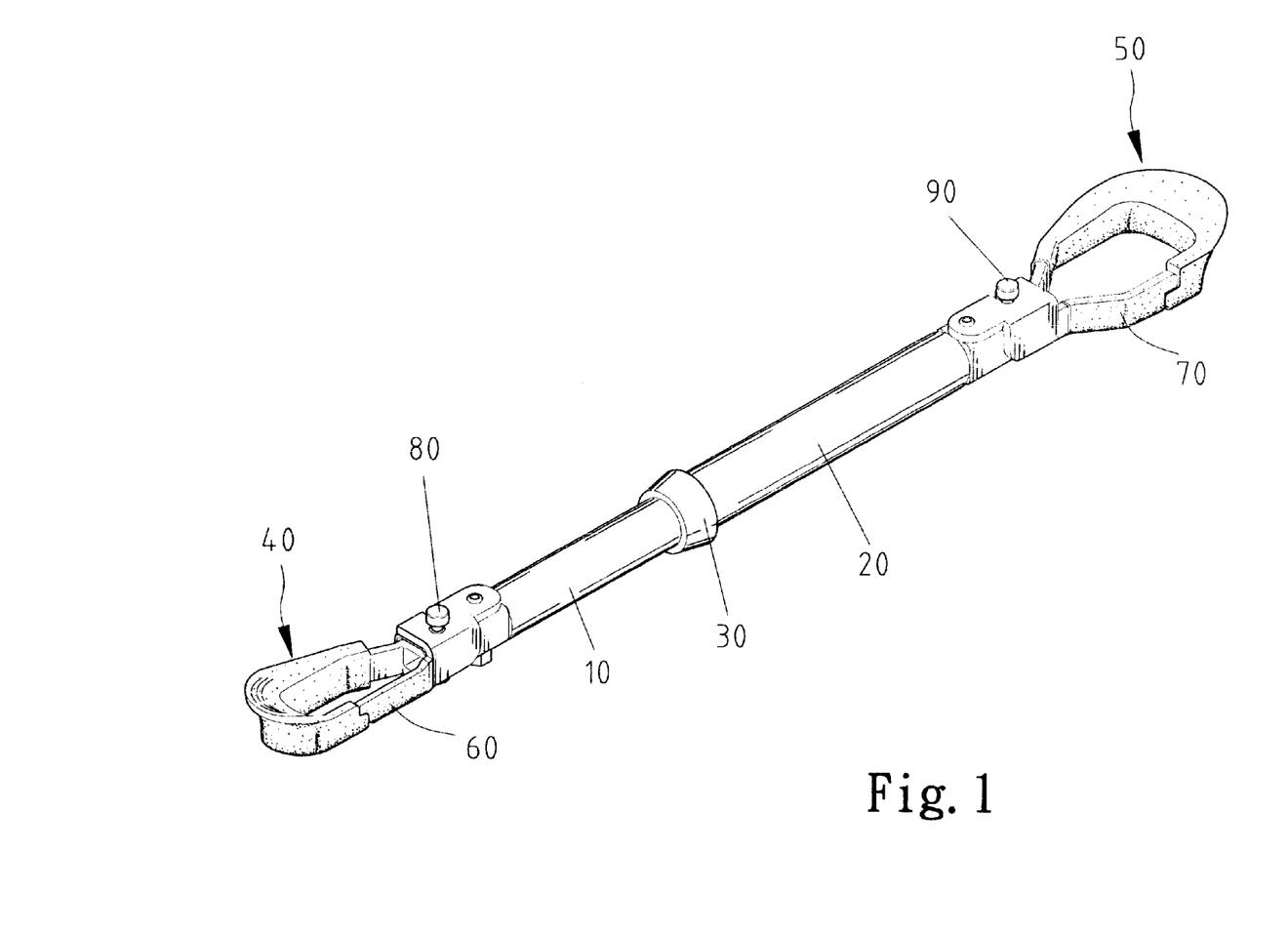
FIG. 1 is a perspective view of a detachable bicycle top tube assembly with a locking device in accordance with the present invention.
Figure 2:
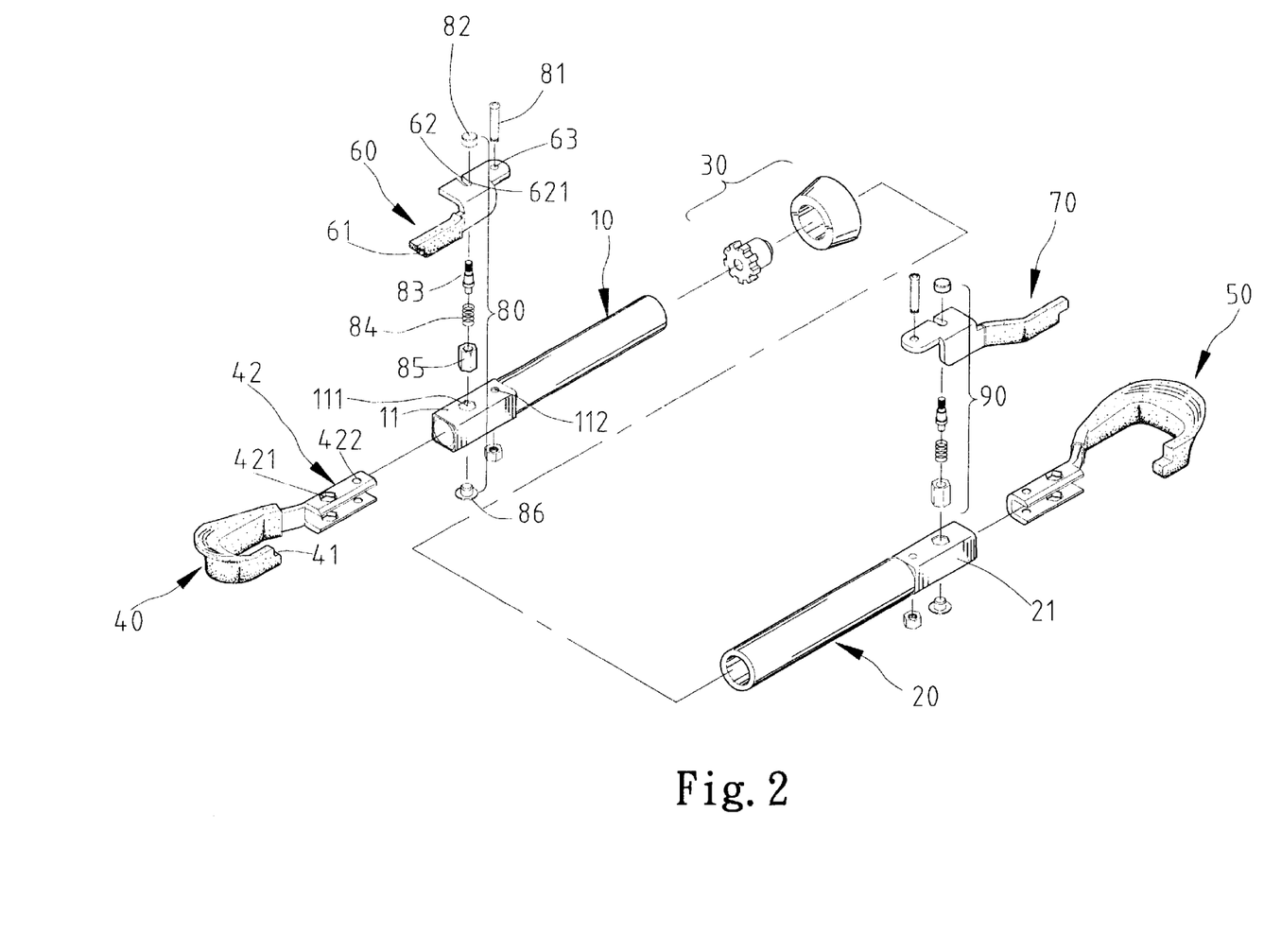
FIG. 2 is an exploded perspective view of the detachable bicycle top tube assembly in accordance with the present invention.

Referring to FIGS. 1 through 8 and initially to FIGS. 1 and 2, a detachable bicycle top tube assembly in accordance with the present invention generally includes a first tube section 10, a second tube section 20, an engaging means 30, a first attaching member 40, a second attaching member 50, a first latch member 60, a second latch member 70, and first and second locking devices 80 and 90.

The first tube section 10 and the second tube section 20 are engaged together via the engaging means 30 to thereby form a top tube. The engaging means 30 and the engaged ends of the first tube section 10 and the second tube section 20 are so configured to allow adjustment in an overall length of the top tube, which is conventional and therefore not described in detail.

The first attaching member 40 is substantially hook-like and includes a first end 42 attached to the other end of the first tube section 10. In this embodiment, the other end of the first tube section 10 includes a non-circular engaging portion 11 with a transverse hexagonal hole 111 and a transverse pivot hole 112. The first end 42 of the first attaching member 40 is substantially U-shape and includes a hexagonal hole 421 and a pivot hole 422. When the first end 42 of the first attaching member 40 is engaged in the engaging portion 11 of the first tube section 10, the hexagonal hole 421 of the first attaching member 40 is aligned with the transverse hexagonal hole 111 of the first tube section 10 and the pivot hole 422 of the first attaching member 40 is aligned with the transverse pivot hole 112 of the first tube section 10. The first attaching member 40 further includes a second end with a stepped end face 41.

The first latch member 60 includes a first end pivotally mounted to the engaging portion 11 of the first tube section 10 and a second end with a stepped end face 61 configured complimentary to the stepped end face 41 of the first attaching member 40. The first end of the first latch member 60 includes a pivot hole 63 that is aligned with the pivot holes 112 and 422 and a pin 81 is extended through the pivot holes 63, 112, and 422. The first latch member 60 is pivotable between a locking position and an unlocking position. When the first latch member 60 is in the locking position, the stepped end face 61 of the first latch member 60 is engaged with the stepped end face 41 of the first attaching member 40. The first end of the first latch member 60 further includes a slot 62 having an enlarged portion 621 and an open end 622 (FIG. 4).

Figure 3:
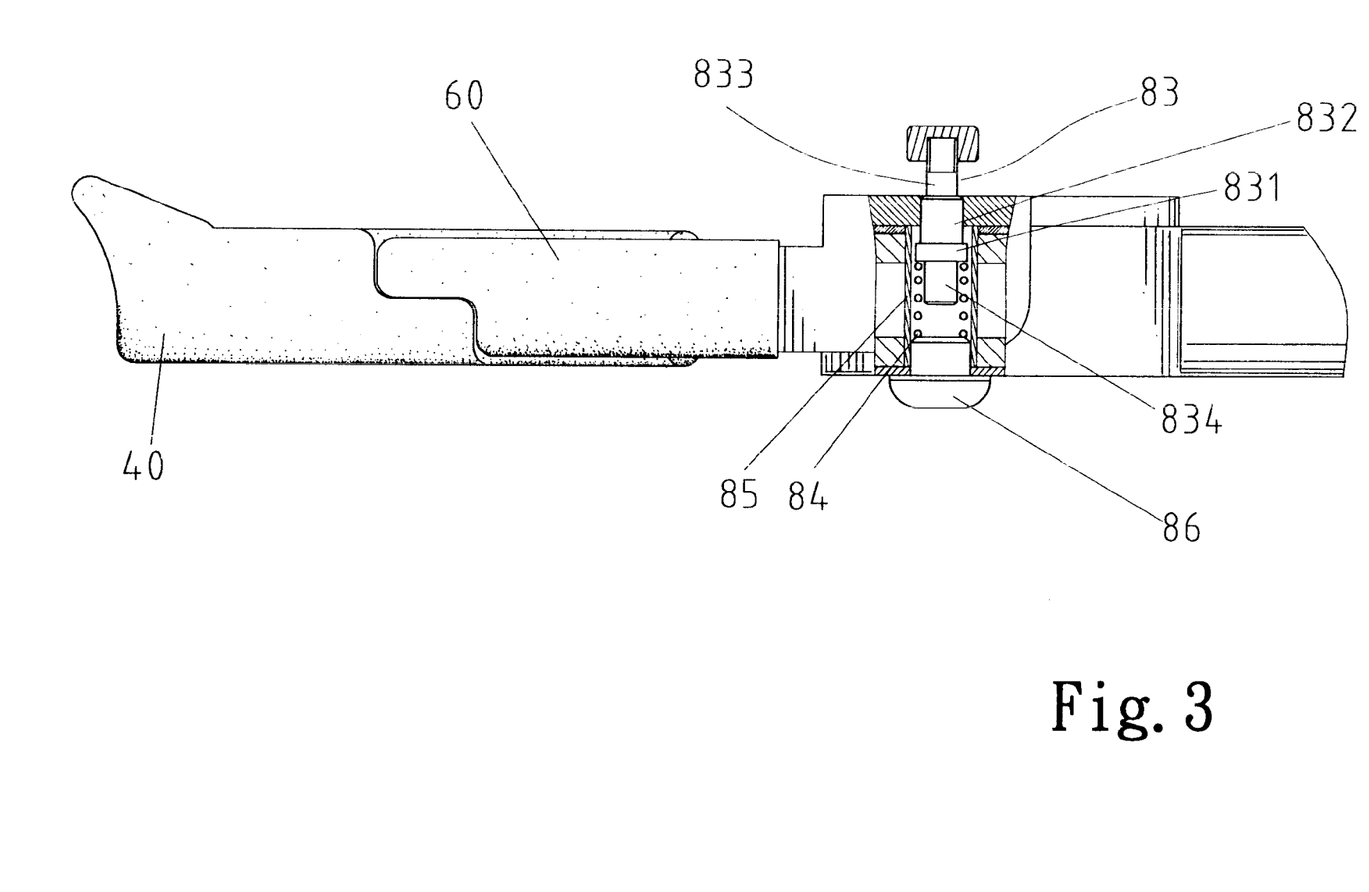
FIG. 3 is a side view, partly sectioned, of a portion of the detachable bicycle top tube assembly in accordance with the present invention, wherein the locking device of the detachable bicycle top tube is in a locked position.

The locking device 80 comprises a push button 82, a stem 83, an elastic element 84, a sleeve 85, and an end cap 86. As illustrated in FIG. 3, the sleeve 85 is received in the hexagonal hole 422 of the first attaching member 40. The end cap 86 encloses an end of the sleeve 85. The elastic element 84 and the stem 83 are mounted in the sleeve 85 with an end of the stem 83 extending beyond the first latch member 60, best shown in FIG. 3. As illustrated in FIG. 3, the stem 83 comprises, in sequence, an end portion 834 around which a portion of the elastic element 84 is mounted, an enlarged portion 831 to which an end of the elastic element 84 is attached, a locking portion 832, and an unlocking portion 833 to which the push button 82 is securely attached. The other end of the elastic element 84 is attached to the end cap 86. A diameter of the locking portion 832 of the stem 83 is substantially the same as an inner diameter of the enlarged portion 621 of the slot 62, and a diameter of the unlocking portion 833 of the stem 83 is substantially the same as or smaller than an inner diameter of the remaining portion of the slot 62. Namely, the diameter of the unlocking portion 833 of the stem 83 is not greater than the slot 62 to thereby allow pivotal movement of the latch member 60 relative to the first attaching member 40 when necessary.

Figure 3A:
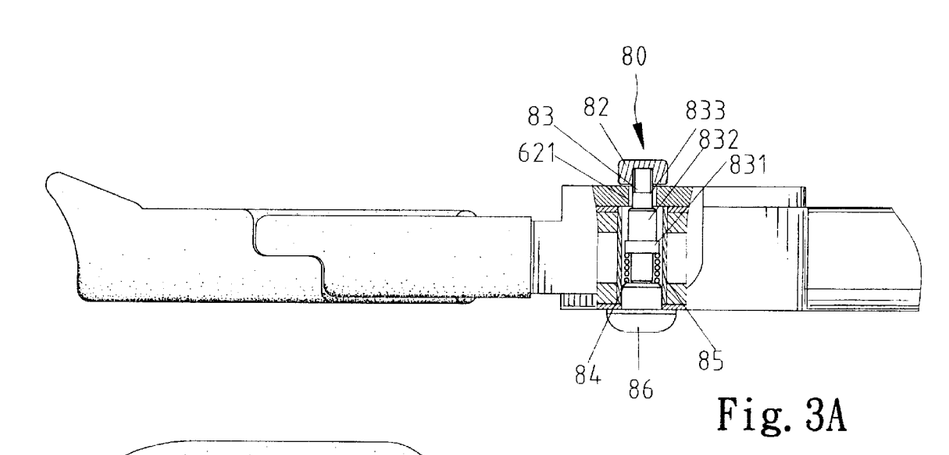
FIG. 3A is a view similar to FIG. 3, wherein the locking device is in an unlocked position.
Figure 4:
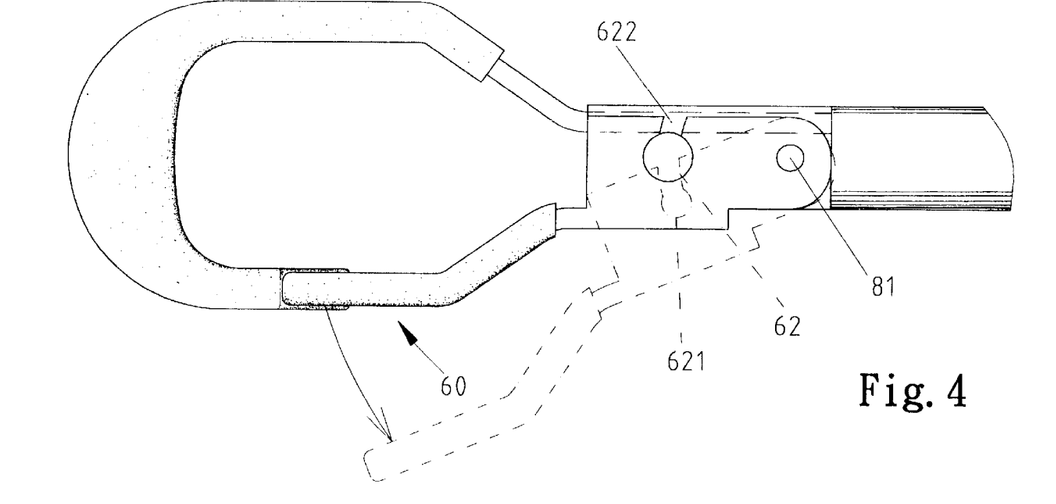
FIG. 4 is a top view of the portion of the detachable bicycle top tube assembly in FIG. 3.
Figures 5, 6:
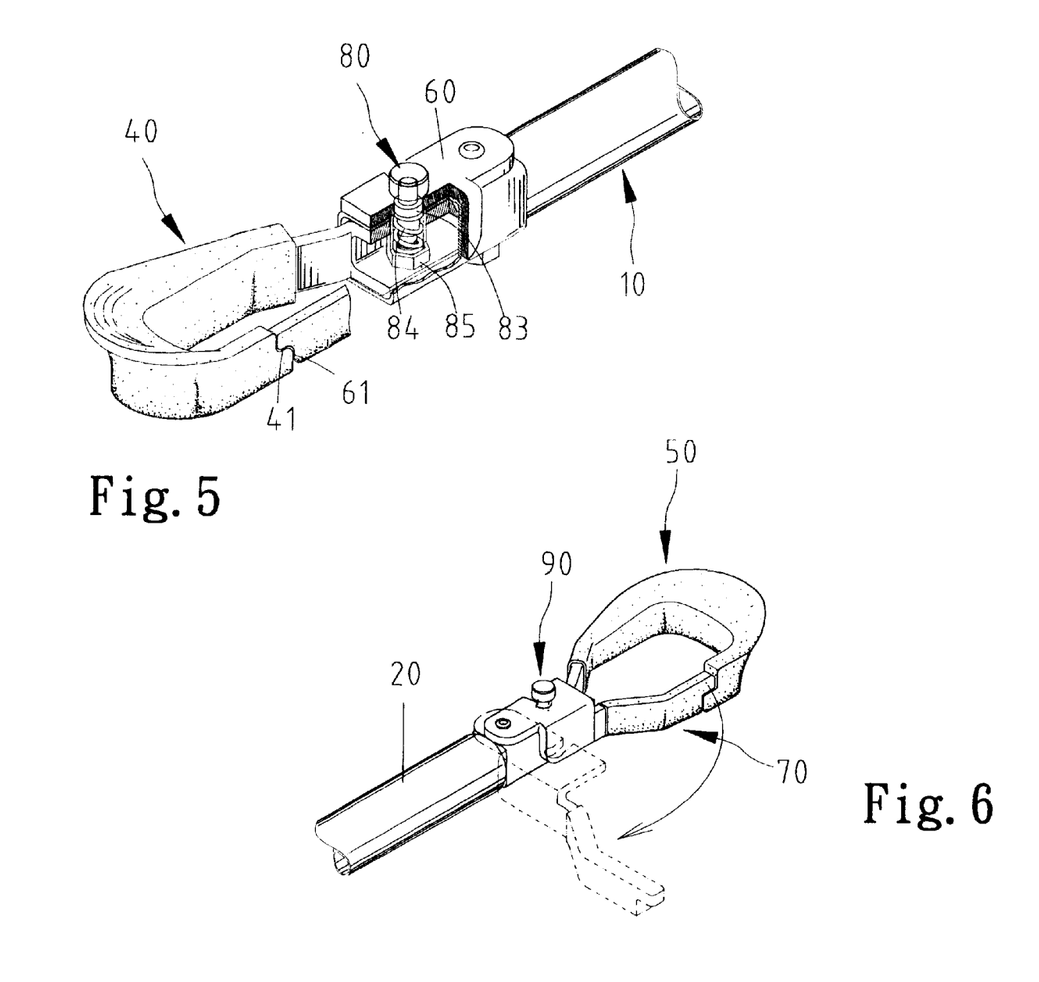
FIG. 5 is a perspective view of the portion of the detachable bicycle top tube assembly in FIG. 3.
FIG. 6 is a perspective view of another portion of the detachable bicycle top tube assembly in accordance with the present invention.
Figure 7:
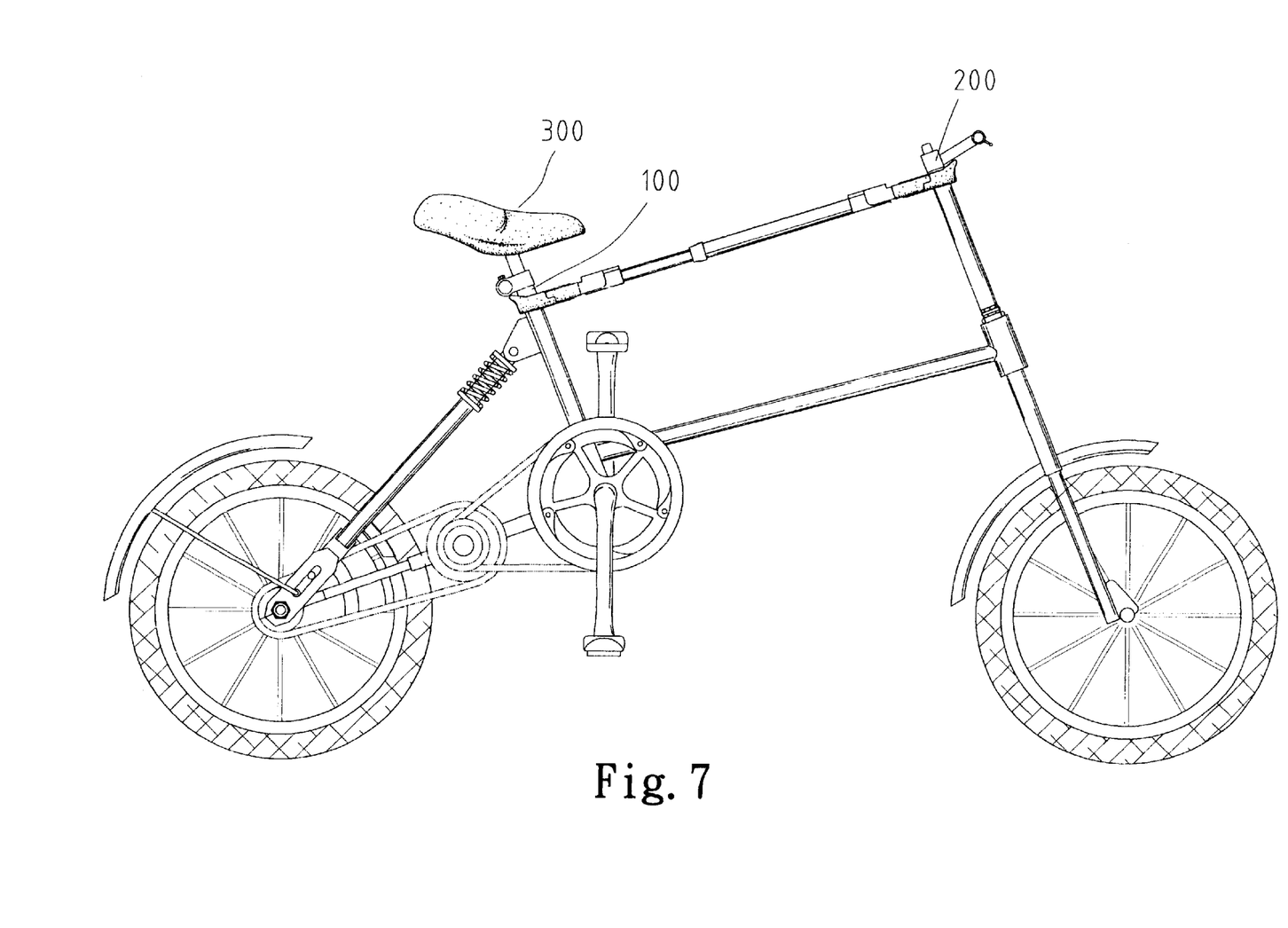
FIG. 7 is a side view of a bicycle with the detachable bicycle top tube assembly in accordance with the present invention.

When the locking device 80 is in a position shown in FIGS. 3 through 5, the locking portion 832 is located in the enlarged portion 621 of the slot 62 of the latch member 60. The latch member 60 cannot be pivoted relative to the first attaching member 40, as the diameter of the locking portion 832 of the stem 83 is greater than the remaining portion of the slot 62. Referring to FIG. 3A, when the push button 82 is pushed, the locking portion 832 of the stem 83 is moved out of the enlarged portion 621 of the slot 62, and the unlocking portion 833 of the stem 83 is moved into the enlarged portion 621 of the slot 62. Thus, the latch member 60 may pivot relative to the first attaching member 40, as the diameter of the unlocking portion 833 is the same as or smaller than the remaining portion of the slot 62. It is further noted that the latch member 60 pivots about a horizontal plane that is parallel to the ground, such that pivotal movement of the latch member 60 will not be interfered by the seat tube 100 or head tube 200 of the bicycle. As a result, the first attaching member 10 can easily be attached to or removed from the seat tube 100 of a bicycle 300 by means of pushing the push button 82.

Figure 8:
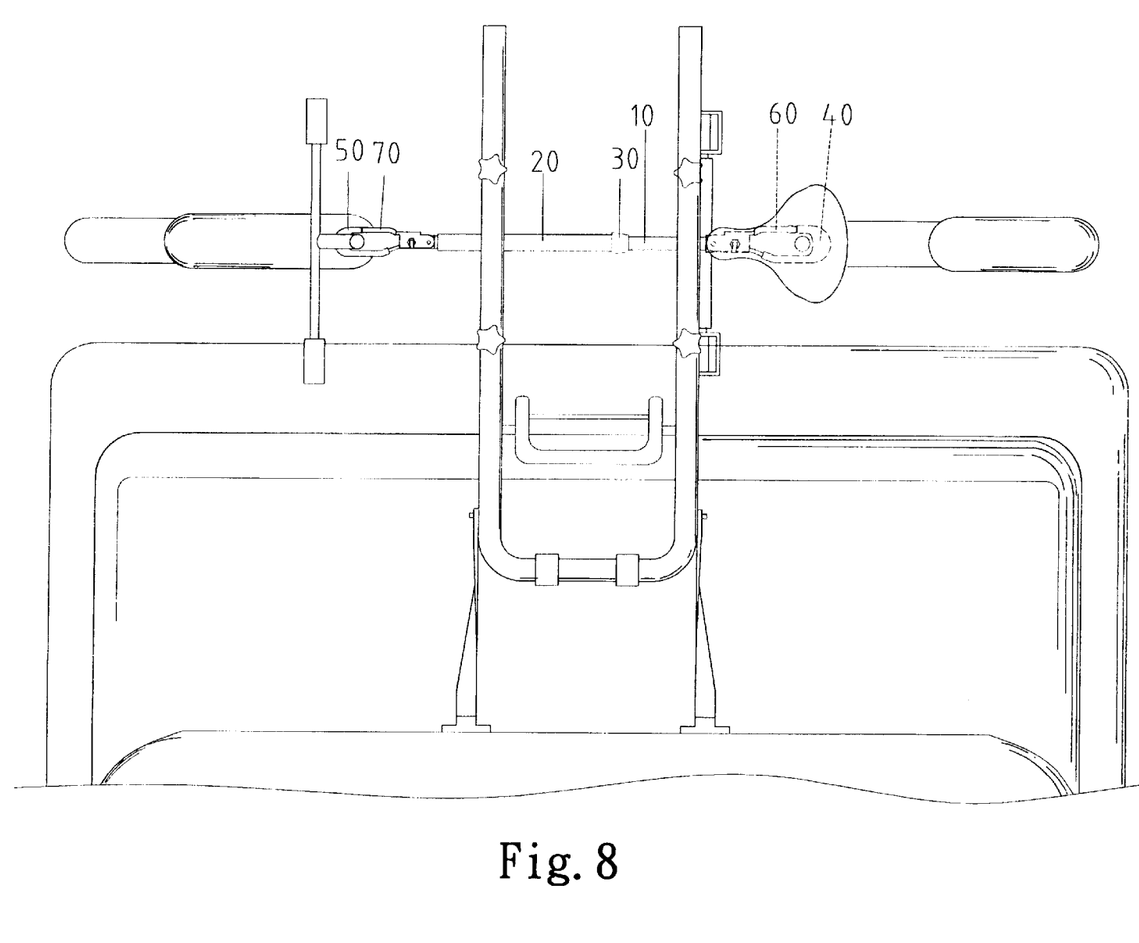
FIG. 8 is a top view illustrating attachment of the bicycle in FIG. 7 to a car.

Structure of the second tube section 20, the second attaching member 50, the second latch member 70, and the second locking device 90 are respectively identical to those of the first tube section 10, the first attaching member 40, the first latch member 70, and the first locking device 80, and FIG. 6 depicts an exploded view of the these members. FIG. 8 depicts attachment of the bicycle 300 to a car, which is conventional.

According to the above description, it is appreciated that the top tube assembly in accordance with the present invention can be detachably attached between the head tube 200 and the seat tube 100 of a bicycle 300 (FIG. 7) without any difficulty. This thanks to the design of pivotal movement of the latch member 60, 70 on a horizontal plane. In addition, the engagement between the attaching member 40, 50 and the respective tube section 10, 20 are more reliable due to the specific design in the U-shape end 42 of the attaching member 40, 50 and the corresponding design in the engaging end 11, 21 of the respective tube section 10, 20.

Although the invention has been explained in relation to its preferred embodiment, it is to be understood that many other possible modifications and variations can be made without departing from the scope of the invention as hereinafter claimed.

What is claimed is:

1. A top tube assembly detachably mounted between a seat tube and a head tube of a bicycle, the top tube assembly comprising:

a tube having two ends;

two hook-like attaching members each having a first end securely attached to an associated said end of the tube, each said attaching member further including a second end, each said attaching member being mounted around an associated one of a seat tube and a head tube of a bicycle; and two latch members each having a first end pivotally connected to the associated end of the tube and a second end, each said latch member being pivotable along a horizontal plane between a locking position in which the second end of the latch member and the second end of an associated said; attaching member are so positioned to prevent disengagement of the associated attaching member from the associated one of the seat tube and the head tube of the bicycle and an unlocking position in which the second end of the latch member is moved to a position allowing disengagement of the associated attaching member from the associated one of the seat tube and the head tube of the bicycle.

2. The top tube assembly as claimed in claim 1, wherein the tube comprises two tube sections that are engaged together in a manner allowing an adjustment in an overall length of the tube.

3. The top tube assembly as claimed in claim 1, wherein the first end of each said attaching member is substantially U-shape, the associated end of the tube comprising a non-circular engaging portion for fittingly and securely receiving the U-shape first end of the associated attaching member.

4. The top tube assembly as claimed in claim 1, wherein the first end of each said attaching member comprises a transverse hexagonal hole and a first pin hole, the associated end of the tube comprising a hexagonal hole aligned with the transverse hexagonal hole and a second pin hole aligned with the first pin hole, the first end of each said latch member comprising a third pin hole aligned with the second pin hole and a slot, the slot including an enlarged portion and an open end, further comprising a locking means for each said attaching member, the locking means comprising:

a sleeve securely received in the transverse hexagonal hole of the associated said attaching member, a stem received in the sleeve and having an end extending into the slot of the associated latch member, the stem including an enlarged locking portion that is releasably engaged in the enlarged portion of the slot of the associated latch member, an elastic element for biasing the stem to a locking position in which the enlarged locking portion is received in the enlarged portion of the slot of the associated latch member, a push button securely mounted to the end of the stem to move therewith;

wherein when the push button is pushed, the enlarged portion of the stem is disengaged from the enlarged portion of the slot of the associated latch member, thereby allowing pivotal movement of the associated latch member relative to the associated attaching member.

5. The top tube as claimed in claim 1, wherein the second end of each said attaching member comprises a stepped end face, the second end of the associated latch member comprising a stepped end face that is complimentary to the stepped end face of the associated attaching member, and the stepped end face of the second end of the associated latch member being engaged with the stepped end face of the associated attaching member when the latch member is in the locking position.

6. The top tube as claimed in claim 4, wherein the second end of each said attaching member comprises a stepped end face, the second end of the associated latch member comprising a stepped end face that is complimentary to the stepped end face of the associated attaching member, and the stepped end face of the second end of the associated latch member being engaged with the stepped end face of the associated attaching member when the latch member is in the locking position.

\* \* \* \* \*